July 14, 1964 R. WAHLSTEDT 3,141,133
ELECTRICAL METER HAVING ITS CORE SUPPORTED BY
RESILIENT SUPPORT MEANS
Filed Jan. 16, 1961 2 Sheets-Sheet 1

INVENTOR
Ragnar Wahlstedt
BY
John L. Stoughton
ATTORNEY

July 14, 1964 R. WAHLSTEDT 3,141,133
ELECTRICAL METER HAVING ITS CORE SUPPORTED BY
RESILIENT SUPPORT MEANS
Filed Jan. 16, 1961 2 Sheets-Sheet 2

United States Patent Office 3,141,133
Patented July 14, 1964

3,141,133
ELECTRICAL METER HAVING ITS CORE SUPPORTED BY RESILIENT SUPPORT MEANS
Ragnar Wahlstedt, East Orange, N.J., assignor to Westinghouse Electric Corporation, East Pittsburgh, Pa., a corporation of Pennsylvania
Filed Jan. 16, 1961, Ser. No. 83,090
5 Claims. (Cl. 324—151)

This invention relates generally to electrical instruments and more particularly to those of the permanent magnet type.

In permanent magnet electrical instrument design, it is desired to produce an instrument in which the scale graduations thereof are more or less even throughout the scale range so that the instrument may be accurately read throughout any portion of its indicating range. In order to do this, it is necessary that the magnetic field through which the coil rotates be uniform, and to accomplish this uniformity of field strength, it is necessary that the magnetic parts be very accurately aligned so that the reluctance to flux flow will be substantially even throughout the moving range of the moving coil. It is also necessary that the magnets which supply the magnetic flux be arranged to provide as uniform a magnetic field as is possible.

It is an object of this invention to provide a new and improved instrument of the character described.

Another object is to provide such an instrument which uses a minimum of parts and which may be assembled with a minimum amount of fixtures.

Another object of this invention is to provide such an instrument in which the various parts thereof may be made by mass production techniques and may be assembled together to provide instruments which are substantially identical in their operation.

Other objects will be apparent from the specification, the appended claims and the drawings, in which drawings:

Figure 4:
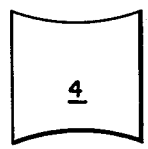
FIGURE 4 is a developed view of one of the pole pieces associated with the cylindrical magnet.

Referring to the drawings by characters of reference, the numeral 1 indicates generally an instrument mechanism comprising a circular cylindrical magnet 2, of suitable material such as alnico, magnetized transversely and provided with pole structures or pieces 4 which are suitably secured to the external surface of the magnet 2 and which serve to provide for substantially equal distribution of magnetic flux across an air gap 8 between the pole pieces 4 and a tubular soft iron flux return ring 10. For the purpose of improving flux distribution, the pole pieces 4 may take the form shown in FIG. 4. The path of the flux may be traced from the north pole N (FIG. 2) through one of the pole pieces 4, the air gap 8, circumferentially around the soft iron tube or ring 10, the air gap 8, the other pole piece 4 to the south pole S of the magnet 2.

The magnet 2 is concentrically located relative to the tubular magnetic flux return ring 10 by means of forward and rear end bridge structures or supporting members 12 and 14. The bridge structures 12 and 14 are similar except that the structure 12 is provided with apertured mounting ears 13. Each bridge member includes a transversely extending section 16 which is provided with a pair of spaced inwardly facing arcuate surfaces 18 which comprise portions of a circle having its center lying in the axis of rotation of the movable coil 22 and of a diameter substantially fitting the outer diameter of the accurately machined surfaces 19 of ring 10. The bridge members also are provided with arcuate fingers 20 which are provided with inwardly facing arcuate surfaces 24 which are machined to comprise portions of a circle coaxial with the axis of rotation of the coil 22 and of a diameter less than the outer diameter of the magnet 2. The shoulders 18 and 24 may be provided with tapered entrances to facilitate the insertions of the magnet 2 and ring 10. The bridge members are held in clamping engagement with the end surfaces of the flux return ring 10 by through bolts 26.

The movable coil 22 is suspended for rotation in the air gap 8 by means of upper and lower taut band suspension units 27 and 28. These suspension units and the associated elements by which these units support the coil 22 for angular rotation in the air gap 8 are more particularly described and claimed in copending patent application Serial No. 761,899, filed September 18, 1958 by Veron S. Thomander for "Instrument Mechanisms," and assigned to the same assignee as this application, now Patent No. 3,111,623 dated November 19, 1963.. For purposes of this application, it is sufficient to describe them as being provided with rectangular wire-like bands 29 and 30 which have their inner end portions anchored to tower structures 32 which are secured to spaced end portions of the movable coil 22. The bands 29 and 30 extend outwardly from the tower structures 32 through the suspension units 27 and 28, respectively, and are anchored to resilient supports 34 and 36 carried by the bridges 12 and 14 such that the taut bands 29 and 30 are concentric with the arcuate surfaces 18 and 24.

The instrument mechanism may be mounted in a suitable frame structure (not shown) by screws extending through the apertured ears 13. A pointer or needle 58 is carried by the forward tower structure 32 and cooperates with a scale plate 59 to indicate the rotative position of the coil 22. One end of the coil 22 is connected to the ribbon-like band 29 and the suspension unit 27 to a conductor 60 which leads to a suitable terminal (not shown). The other end of the coil 22 is connected through the band 30 and suspension unit 28 to a second conductor 62 which leads to a second terminal (not shown).

Figure 2:
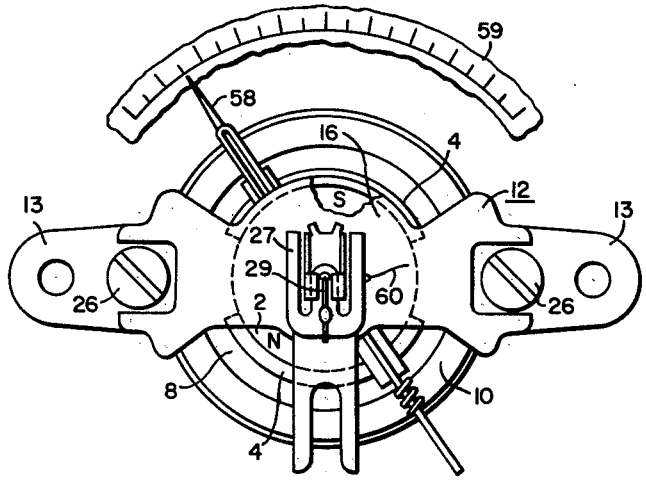
FIGURE 2 is a partial top plan view of the instrument shown in FIG. 1.
Figure 1:
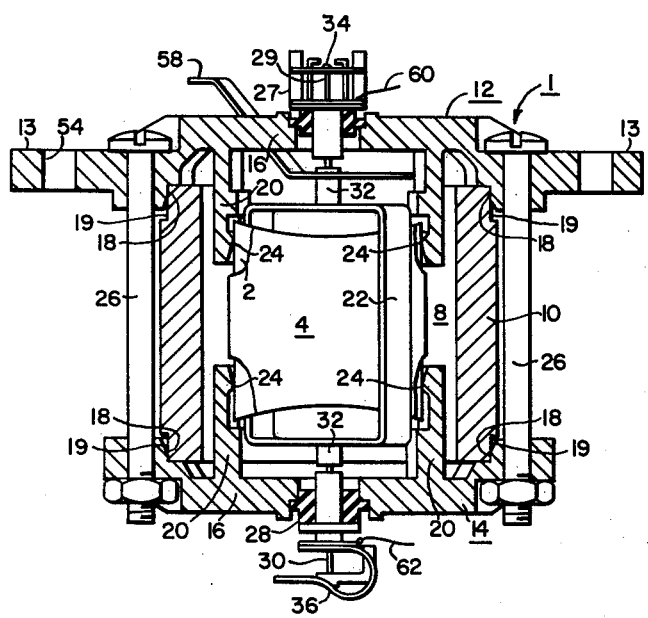
FIGURE 1 is a view in vertical section illustrating an instrument embodying a preferred form of the invention.
Figure 3:
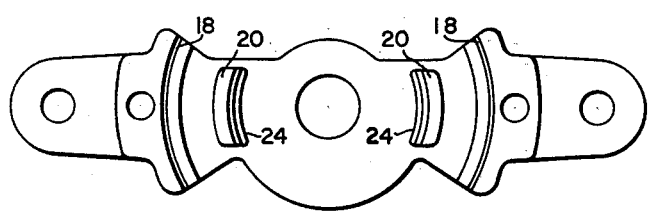
FIGURE 3 is a detailed view of one of the magnet positioning structures shown in FIG. 1.

When a voltage is applied between the terminals to which the conductors 60 and 62 are connected, current will flow through the coil 22 setting up a flux which reacts with the flux flowing across the air gap 8 due to the magnet 2 in a direction to cause the coil 22 to rotate clockwise (FIG. 2). Rotation of the coil 22, twists the ribbon-like bands 29 and 30 until a balance exists between the force due to the twisting of the ribbon-like bands 29 and 30 and the force exerted by the coil 22. When the system is in balance, the pointer 58 will cooperate with the indicia 59 to indicate the intensity of the current flowing through the coil 22.

It will be apparent that the coil 22 may be connected in series with a current conductor and in which event the current flowing through the coil 22 will be equal to or at least proportional to the current flowing through the conductor depending upon the existence or nonexistence of a shunt path between the conductors 60 and 62. The instrument may be used for measuring voltage by inserting a suitable resistance in series with the conductors 60 and 62 and then connecting these conductors across the source of potential which is to be measured.

Figure 5:
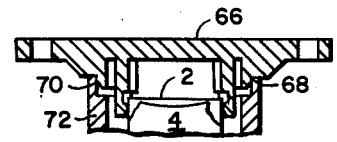
FIGURE 5 is a partial view showing a modified form of supporting bracket which may be used in place of the supporting bracket illustrated in FIG. 1.

In FIG. 5, there is shown a modified form of bridge structure 66. Only the forward bridge structure is illustrated but it is contemplated that a rear structure of substantially the same construction would also be utilized in a manner which is apparent from FIGS. 1-5. The bridge structure 66 is provided with outwardly facing arcuate surfaces 68 which engage an inwardly facing portion 70 of a soft iron tube return member 72 so that an exact fit or slight press fit is obtained. The structure 66 also includes the fingers 20 and surfaces 24 which engage and position the magnet 2, and which are urged into tighter engagement due to the press fit between the surface 68 and the member 72.

With applicant's construction as illustrated in FIGS. 1 through 5, it will be apparent that the engaging surfaces 24 may be accurately machined for exact or slight press fits therebetween since the construction provides for slight resiliency of the extending bridge portions which are provided with the arcuate surfaces 18 and 24.

Figure 7:
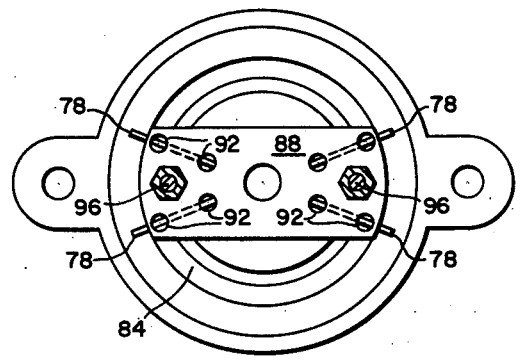
Figure 6:
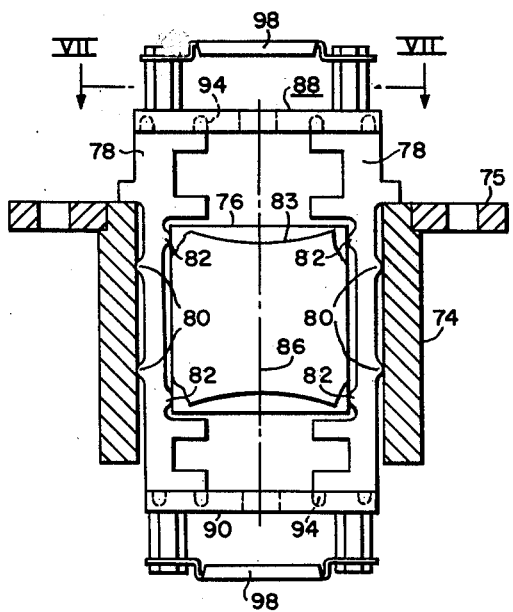
FIGURE 6 is a view in central vertical section showing a modified form of mechanism structure embodying the invention; and, FIGURE 7 is a view taken substantially along the lines VII—VII of FIG. 6 and looking in the direction of the arrows.

FIGS. 6 and 7, illustrate a modified form of the invention in which the soft iron tubular member 74 is carried by an annular mounting ring 75 and the circularly cylindrical magnet 76 is resiliently supported concentrically in the member 74 by a plurality of elongated supporting elements 78. Each of the elements 78 is provided with a first pair of outwardly facing spaced abutments 80 which engage the inner wall of member 74 and a second pair of spaced abutments 82 which are arranged in staggered relation with the first pair of abutments 80. The abutments 82 extend outwardly from the opposite surfaces of the element 78 and engage the outer surface of the magnet 76 adjacent the side edge portions of their pole pieces 83. The elements 78 extend axially of the magnet 76 and member 74 and are arranged generally in an X-shape to provide two pairs of diametrically positioned elements 78. The axis of rotation 86 of the coil which rotates in the air gap 84 passes through the cross point of the X. The elements 78 are held in their desired position by forward and rearward bridge structures 88 and 90 which are provided with spaced apertures 92 into which longitudinally extending abutments 94 of the elements 78 extend.

The dimensions of the inner surface of the tube 74 and of the outer surface of the magnet 76 are so related with respect to the dimension between the abutments 80 and 82 that a slight press fit is provided when the magnet 76 is positioned within the member 74. In this regard it will be observed that the abutments 80 are longitudinally displaced from the abutments 82 whereby the elements 78 may flex slightly to permit limited movement of the abutments 80 and 82 to resiliently hold the magnet 76 concentrically of the member 74.

The bridge structures 88 and 90 are held against the end surfaces of the elements 78 by through bolts 96. The structures 88 and 90 are also provided with apertures coaxial with the member 74 and magnet 76 which are adapted to receive supporting structures such as the units 27 and 28 of FIG. 1 by which a coil such as the coil 22 may be suspended for rotation in the air gap 84. If desired, the through bolts 96 may extend beyond the bridge structures 88 and 90 and support guard members 98 which are outwardly spaced axially from the structures 88 and 90 to protect the units 27 and 28.

While there have been shown but a limited number of modifications of the invention, it is to be understood that other modifications may be made coming within the scope of the invention, and it is desired to cover such modifications as fall within the scope of the herein described invention.

What is claimed and is desired to be secured by United States Letters Patent is as follows:

1. An article of manufacture comprising a hollow sleeve having an inner circularly cylindrical surface of a first diameter and having spaced pairs of locating surfaces, a first of said pairs of surfaces being located adjacent one end portion of said sleeve and a second of said pairs of surfaces being located adjacent the other end portion of said sleeve, a cylinder having a circularly cylindrical outer surface of a second diameter less than said first diameter, means providing spaced pairs of axially extending diametrically spaced locating surfaces rigid with said cylinder and intermediate said cylinder and said sleeve, a first of said pairs of said cylinder locating surfaces being located adjacent a first end portion of said cylinder and a second of said pairs of said cylinder locating surfaces being located adjacent a second end portion of said cylinder, means supporting said cylinder in said sleeve to provide an air gap therebetween, said supporting means including first and second cylinder supporting members, each said supporting member comprising a bridge portion with spaced locating surfaces and a pair of spaced elongated laterally extending resilient locating fingers, a first of said supporting members being located adjacent said one end portion of said sleeve with its said locating surfaces in locating engagement with said first pair of locating surfaces of said sleeve, a second of said supporting members being located adjacent said other end portion of said sleeve with its said locating surfaces in locating engagement with said second pair of locating surfaces of said sleeve, said first supporting member having its said spaced locating fingers extending therefrom with their longitudinal axes in a direction such that the directional component of their said longitudinal axis which extends in a direction longitudinally of said sleeve is substantially greater than the directional component which extends radially of said sleeve, said fingers of said first member extending inwardly of said sleeve into said gap, said just mentioned fingers being provided with locating surfaces yieldably movable in a direction radially of said cylinder to a greater extent than in the longitudinal direction of said cylinder to locatingly position said first pair of locating surfaces of said cylinder, said second supporting member having its said spaced fingers extending therefrom with their longitudinal axes in a direction such that the directional component of their said longitudinal axis which extends in a direction longitudinally of said sleeve is substantially greater than the directional component which extends radially of said sleeve, said fingers of said second member extending inwardly of said sleeve into said gap and being provided with locating surfaces yieldably movable in a direction radially of said cylinder to a greater extent than in the longitudinal direction of said cylinder to locatingly position said second pair of locating surfaces of said cylinder, means clamping said supporting members to said sleeve, means establishing magnetic flux across said gap and including said sleeve and said cylinder, and a movable coil side in said gap.

2. An article of manufacture comprising a hollow sleeve having an inner circularly cylindrical surface of a first diameter and having an outer surface with spaced pairs of outwardly facing locating shoulders, a first of said pairs of shoulders being located adjacent one end portion of said sleeve and a second of said pairs of shoulders being located adjacent the other end portion of said sleeve, a cylinder having a circularly cylindrical outer surface of a second diameter less than said first diameter and having spaced pairs of locating surfaces on its said outer surface, a first of said pairs of said cylinder locating surfaces being located adjacent a first end portion of said cylinder and a second of said pairs of said cylinder locating surfaces being located adjacent a second end portion of said cylinder, first and second cylinder supporting members supporting said cylinder within said sleeve with said outer surface in fixed position relative to said inner surface and providing an arcuate gap between said sleeve and said cylinder, each said member comprising a bridge portion with spaced locating surfaces and a pair of spaced laterally extending resilient locating fingers, a first of said supporting members being located adjacent said one end portion of said sleeve with its said locating surfaces in locating engagement with said first pair of locating shoulders of said sleeve, a second of said supporting members being located adjacent said other end portion of said sleeve with its said locating surfaces in locating engagement with said second pair of locating shoulders of said sleeve, said first supporting member having its said spaced locating fingers extending inwardly of said sleeve into said gap and being provided with diametrically spaced locating surfaces movable radially of said cylinder and locatingly engaging said first pair of locating surfaces of said cylinder, said second supporting member having its said spaced fingers extending inwardly of said sleeve into said gap and being provided with diametrically spaced locating surfaces movable radially of said cylinder and locatingly engaging said second pair of locating surfaces of said cylinder, all of said fingers and said outwardly facing shoulders being located in a single plane extending diametrically of and axially of said cylinder clamping means located in said plane outwardly of said outwardly facing shoulders of said sleeve, means establishing a magnetic flux across said gap and including said sleeve and said cylinder, a coil side located in said gap, and means carried by said supporting members and supporting said coil side for arcuate movement in said gap.

3. An article of manufacture comprising a hollow sleeve having an inner circularly cylindrical surface of a first diameter and having first and second pairs of diametrically spaced locating surfaces, a first of said pairs of surfaces being located adjacent one end portion of said sleeve and a second of said pairs of surfaces being located adjacent the other end portion of said sleeve, a cylinder having a circularly cylindrical outer surface of a second diameter less than said first diameter and having first and second pairs of diametrically spaced outwardly facing locating surfaces, a first of said pair of said cylinder locating surfaces being located adjacent a first end portion of said cylinder and a second of said pairs of said cylinder locating surfaces being located adjacent a second end portion of said cylinder, means supporting said cylinder within said sleeve with said outer surface in fixed position relative to said inner surface to provide an annular gap, said last-named means comprising first and second cylinder supporting members, each said member being of greater length than the diametric dimension of said locating surfaces of said sleeve and including a bridge portion with spaced locating surfaces and a pair of spaced resilient locating fingers extending laterally from said bridge portion, a first of said cylinder supporting members being located adjacent said one end portion of said sleeve with its said bridge portion extending substantially diametrically across said sleeve one end portion and with its said locating surfaces in locating engagement with said first pair of locating surfaces of said sleeve, a second of said cylinder supporting members being located adjacent said other end portion of said sleeve with its said bridge portion extending substantially diametrically across said sleeve other end portion and with its said locating surfaces in locating engagement with said second pair of locating surfaces of said sleeve, said first cylinder supporting member having its said spaced locating fingers extending inwardly of said sleeve within said gap and being provided with locating surfaces movable radially of said cylinder and locatingly engaging said first pair of locating surfaces of said cylinder, said second cylinder supporting member having its said spaced fingers extending inwardly of said sleeve within said gap and being provided with locating surfaces movable radially of said cylinder and locatingly engaging said second pair of locating surfaces of said cylinder, clamping means located externally of said sleeve and clamping said members against said locating surfaces of said sleeve means establishing a magnetic flux across said gap and including said sleeve and said cylinder, a coil having coil sides located in diametrically opposite portions in said annular gap, and means located in fixed position relative to said supporting members and supporting said coil for rotational movement in said annular gap.

4. An instrument mechanism comprising a circularly cylindrical hollow sleeve of a first axial length and having an inner surface of a first diameter and having an outer surface with spaced pairs of diametrically arranged arcuate locating surfaces concentric about the axis of said inner surface, a first of said pairs of surfaces being located at one end portion of said sleeve and a second of said pairs of surfaces being located at the other end portion of said sleeve, a solid circularly cylindrical permanent magnet of a second axial length less than said first axial length and having an outer surface of a second diameter less than said first diameter, said magnet having spaced pairs of arcuate locating surfaces on its said outer surface concentric about the axis of said magnet, a first of said pairs of said magnet locating surfaces being located adjacent a first end portion of said magnet and a second of said pairs of said magnet locating surfaces being located adjacent a second end portion of said magnet, means supporting said magnet within said sleeve with said outer surface in fixed positions relative to said inner surface to provide an annular gap therebetween and including first and second magnet bridge members, each said bridge member comprising a bridging portion with arcuate spaced locating surfaces and a pair of spaced elongated resilient locating fingers extending laterally outwardly from said bridging portion intermediate its said locating surfaces, a first of said magnet supporting members being located at said one end portion of said sleeve with its said bridging portion extending substantially diametrically across said sleeve and with its said arcuate locating surfaces in tight engagement with said first pair of locating surfaces of said sleeve, a second of said magnet supporting members being located at said other end portion of said sleeve with its said bridging portion extending substantially diametrically across said sleeve and with its said locating surfaces in tight engagement with said second pair of locating surfaces of said sleeve, said first magnet supporting member having its said spaced locating fingers extending inwardly of said sleeve within said gap and being provided with locating surfaces movable radially of said magnet and tightly engaging said first pair of locating surfaces of said magnet, said second magnet supporting member having its said spaced fingers extending inwardly of said sleeve within said gap and being provided with locating surfaces movable radially of said magnet and tightly engaging said second pair of locating surfaces of said magnet, the width of said fingers measured in a plane extending perpendicular to the longitudinal axis of the said bridging portions with which it is associated is less than the radial dimension of the said locating surface of said magnet which it engages whereby said spaced fingers flex to adjust the spacing of their said locating surfaces to resiliently hold the end portion of said magnet with which the said fingers are associated, clamping means connected between said bridge members outwardly of said sleeve for tightly holding said bridge members against the end surfaces of said sleeve, a coil having coil sides, means carried by said magnet supporting members and supporting said coil sides for rotational movement in said gap.

5. An instrument mechanism comprising a non-permanent magnetic material hollow sleeve having an inner circularly cylindrical surface concentric about an axis, a first pair of arcuate locating surfaces diametrically spaced about said axis and concentric about said axis, said first pair of locating surfaces forming a part of the outer surface of said sleeve at a first end portion thereof, said first pair of locating surfaces forming first shoulders with the end surface of said sleeve at said first end portion, a second pair of arcuate locating surfaces diametrically spaced about said axis and concentric about said axis, said second pair of locating surfaces forming a part of said sleeve outer surface at a second end portion thereof, said second pair of locating surfaces forming second shoulders with the end surface of said sleeve at said second end portions, a circularly cylindrical permanent magnet having an axial dimension less than the axial dimension of said sleeve, said magnet having first and second spaced pairs of supporting surfaces arcuate about the longitudinal centerline of said magnet and located respectively adjacent a first and a second end portion of said magnet, supporting means for supporting said magnet concentrically within said sleeve to provide an annular flux gap, said supporting means comprising first and second elongated bridging members located at said first and second end portions of said sleeve respectively, each said bridging member extending substantially diametrically of said sleeve through said axis and being of a longitudinal dimension greater than the diametric dimension of said sleeve and provided with a pair of shouldered arcuate locating surfaces concentric about said axis and of a dimension to engage the said shoulders at the said end portion of said sleeve at which the respective said bridging member is located, each said bridging member being provided with a pair of spaced elongated resilient fingers extending into said gap axially thereof, each said pair of fingers being provided with shouldered magnet supporting surfaces arcuate about said axis as a center of curvature movable radially of said magnet and engageable with the said pair of magnet surfaces at the adjacent said end portions of said magnet, each said last named pair of surfaces having a dimension therebetween less than the distance between said pair of said surfaces of said magnet at the respective adjacent said end portion of said magnet, clamping means connecting together the respective portions of said bridging member which lie on the same side of said axis and external to said sleeve for clamping said shouldered surfaces of said bridging members to the respective said sleeve shoulders, a coil having coil sides spaced apart a distance greater than the diametric dimensions of said magnet and less than the diametric dimension of said inner surface of said sleeve, and means carried by said bridging members supporting said coil with said sides in said gap for rotational movement about said axis as a center in response to current flow through said coil.

References Cited in the file of this patent

UNITED STATES PATENTS

| | | |
|---|---|---|
| 1,604,611 | Simpson | Oct. 26, 1926 |
| 1,927,346 | Lawrence | Sept. 19, 1933 |
| 2,416,835 | Lingel | Mar. 4, 1947 |
| 2,887,657 | Lamb | May 19, 1959 |
| 2,978,640 | Arbeiter | Apr. 4, 1961 |

FOREIGN PATENTS

| | | |
|---|---|---|
| 120,994 | Australia | Feb. 28, 1946 |